United States Patent Office 3,172,921
Patented Mar. 9, 1965

3,172,921
RESINOUS COMPOSITIONS
Ralph G. Flowers, Pittsfield, Mass., assignor to General Electric Company, a corporation of New York
No Drawing. Filed Oct. 27, 1961, Ser. No. 148,043
7 Claims. (Cl. 260—836)

This invention relates to new and useful resinous compositions. More particularly, it relates to new thermosetting resinous compositions which are characterized by good electrical and physical qualities and at the same time are extrudable and thus particularly useful for insulating electrical conductors. They are also readily molded and make good hot-melt laminates.

The use of thermosetting resinous electrical insulation for conductors and the like as well as their use in molded structures is well known. However, generally speaking, such thermosetting resins are not readily extrudable on electrical conductors and must be so applied generally from solutions or by other means which complicates and makes more expensive their use as an insulating material.

It is a principal object, therefore, of this invention to provide thermosetting resinous compositions which are readily extrudable as electric insulation and which are also useful for molding, laminating and other applications where desirable electrical properties are required combined with flexibility, toughness and heat resistance.

Briefly, the invention relates to thermosetting resinous compositions comprising by weight 100 parts of thermosetting resin, from 10 to 50 parts of alkali metal or alkali metal type polymerized polybutadiene containing an appreciable percent of 1,2-butadiene polymer, from about 25 to 135 parts of polyvinylal resin, along with curing agents for the thermosetting resin and for the polybutadiene. Generally speaking, the usual well known amounts of curing agents are used for the thermosetting resin. Preferably, from 1 to 15 percent of a suitable curing agent is used for the polybutadiene based on the weight of the polybutadiene.

Those features of the invention which are believed to be novel are set forth particularly in the claims appended hereto. The invention will, however, be more thoroughly understood and further advantages and objects thereof appreciated from a consideration of the following description.

Among the thermosetting resins which are found to be useful in conjunction with the present invention are the so-called epoxy resins, polyamides, polyesters and polyurethanes, such thermosetting resins being well known in the art.

The epoxy resins used in conjunction with my invention are described, for example, in United States Patents 2,324,-483 and 2,444,333, British Patents 518,057 and 579,698. Generally, the epoxy resins described therein are the reaction product of an epihalogenohydrin such as epichlorohydrin and a phenol having at least two phenolic hydroxy groups such as bis-(4-hydroxyphenyl)-2,2-propane. United States Patents 2,494,295; 2,500,600 and 2,511,913 describe further epoxy resins which can be used in conjunction with my invention. The above patents are hereby incorporated by reference in this application. The epoxy resins herein have more than one epoxy group per molecule. They can be prepared by reacting a polyhydroxy alcohol or phenol such as hydroquinone, resorcinol, glycerine and condensation products of phenols with ketones, for example, bis-(4-hydroxyphenyl)-2,2 propane with epichlorohydrin. The reaction of epichlorohydrin with bis-(4-hydroxyphenyl)-2,2-propane is as follows:

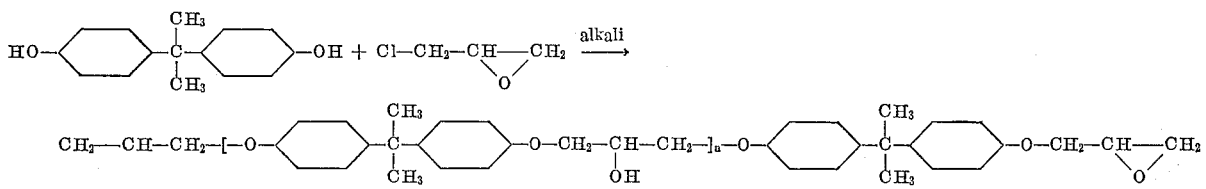

where $n$ has an average value ranging from 0 to about 10. Such epoxy resins as the above reaction product of epichlorohydrin with bis-(4-hydroxyphenyl)-2,2-propane are sold under the name of Epon, under the name Araldite, as ERL resin, and as Epi-Rez resins. The data given below for such resins is representative.

TABLE I

| Epoxy Resins | Epoxide Equivalent | M.P., ° C. |
| --- | --- | --- |
| Epon 828 | 192 | 9. |
| Epon 834 | 225–290 | 20–28. |
| Epon 1001 | 450–525 | 64–76. |
| Epon 1004 | 905–985 | 97–103. |
| Epon 1007 | 1,600–1,900 | 127–133. |
| Epon 1009 | 2,400–4,000 | 145–155. |
| Epon 1064 | 300–375 | 40–45. |
| Araldite 6010 | 192 | Liquid. |
| Araldite 6020 | 200–205 | Do. |
| ERL 2774 | 175–200 | Do. |
| Epi-Rez 510 | 175–200 | Do. |

Epoxy resins in general also can be used including those based on other glycidyl type materials as well as those based on aliphatic radicals including oxidized polyolefins among others.

The usual epoxy resin curing agents of the acid, anhydride, amine and other types can be used in the proportions normal for the particular epoxy resins.

The alkali metal-polymerized polybutadiene used in connection with the present invention contains an appreciable percentage, or about 40 percent, of 1,2-butadiene polymer and is thus curable by means of the usual vinyl polymerization type catalysts, including barium peroxide, sodium peroxide, benzoyl peroxide, tertiary butyl perbenzoate, dicumyl peroxide, tertiary butyl hydroperoxide, among many others which are known to those skilled in the art which react above the softening point of the composition.

In preparing the materials of the invention, the ingredients are milled on hot rolls to obtain a homogeneous mix. After such thorough mixing the materials can be extruded as desired, with usual extruding equipment with heated dies on electric conductors or other structures. The materials can be molded into various structural shapes or they can be used as a hot melt in the formation of laminates using paper, films, fabrics, or other laminae as desired. The resulting cured materials are flexible, tough and heat resistant. It will be realized, of course, that the usual well known fillers may be used, such as alumina, hydrated alumina, wood flour, silica, carbon black, iron oxide, titanium dioxide and the like to extend the materials or to impart thereto specific desired characteristics. The polyvinyl acetal resins or polyvinyal resins used herein are well known and are the reaction product of an aldehyde with a product of hydrolysis of a polyvinyl ester. They are described, for example, in Reissue Patent 2,430 and include polyvinyl formal, polyvinyl acetal, polyvinyl butyral, polyvinyl propionate.

The following examples will illustrate the practice of the invention, it being realized that these examples are illustrative only of these materials and applications to which such materials may be applied. All parts and proportions are by weight.

*Example 1*

There were mixed together on hot milling rolls a mixture of, by weight 48 parts of diallyl phthalate, 24 parts polyvinyl formal as a film former and 33 parts Epon 1007. This mixture was in turn milled with 12 parts of sodium polymerized butadiene containing about 40 percent of 1,2-butadiene polymer and 2.5 parts of dicumyl peroxide along with 0.5 part of boric acid as a curing agent for the epoxy resin. The product so made is extrudable in a thick film by a single pass on electric conductors and cures to a tough, flexible coating when heated at 250° C. to 300° C. for about five to ten minutes. It is also useful as a molding material and when molded at 170° C. and 10,000 p.s.i. for 30 minutes, produced a hard, flexible disk 125 mils in thickness.

*Example 2*

There were milled on hot rolls a mixture of 56.5 parts diallylphthalate, 27.5 parts polyvinyl formal and 38.5 parts Epon 1007 with 20 parts of sodium polymerized butadiene rubber as above, 3 parts of dicumyl peroxide as a curing agent for the polybutadiene and 0.5 part of boric acid as a curing agent for the epoxy resin. The resultant material was readily extrudable using usual extruding equipment, and when molded for 30 minutes at 170° C. under a pressure of 10,000 p.s.i. into a disk 150 mils in thickness gave a tough, flexible, thermoset structure.

*Example 3*

There were milled on hot rolls 80 parts of polyvinyl formal and 60 parts of Epon 1004 until a homogeneous mix was produced. There were then milled into this material 20 parts of sodium polymerized butadiene, 2 parts of dicumyl peroxide and 1 part of boric acid to produce a readily extrudable composition. When molded as above, the material proved to be tough and somewhat flexible.

*Example 4*

There were milled together on hot mill rolls 80 parts of polyvinyl formal, 60 parts Epon 1004, 20 parts sodium polymerized butadiene, 2 parts dicumyl peroxide and 15 parts methyl Nadic anhydride. Methyl Nadic anhydride is the adduct of methylcyclopentadiene and maleic anhydride. The extrudable material so produced was very useful as a conductor coating and in the molded form was tough and flexible.

Polyesters and polyamides are also useful in the present connection as are polyurethane materials and other thermosetting resins.

There are provided by the present invention thermosetting resin compositions which are readily extrudable on electric conductors to provide in one pass electric insulation which is not only characterized by good electrical qualities but which is tough, flexible and generally resistant to physical abuse. In this connection, it provides a distinct advantage in the application of relatively heavy electric insulated coatings as opposed to usual resin solution application procedures which involve multiple passes. At the same time, the materials can be easily molded into desired structural shapes possessed of the same salutary characteristics. They can also be used by the hot melt process to provide laminates having the same characteristics.

What I claim as new and desire to secure by Letters Patent of the United States is:

1. A resinous composition comprising by weight 100 parts of epoxy resin comprising the reaction product of an epihalogenohydrin and a phenol having at least two phenolic hydroxyl groups, a curing agent for said epoxy resin, from about 10 to 50 parts of alkali metal polymerized polybutadiene, a peroxide curing agent for said polybutadiene and from about 25 to 135 parts of polyvinyl formal resin.

2. A curable, resinous composition comprising by weight about 40.8 parts of epoxy resin comprising the reaction product of an epihalogenohydrin and a phenol having at least two phenolic hydroxyl groups, 59.2 parts of diallyl phthalate, 29.6 parts of polyvinyl formal and 14.8 parts of alkali metal polymerized polybutadiene.

3. A curable, resinous composition comprising by weight about 40.5 parts epoxy resin comprising the reaction product of an epihalogenohydrin and a phenol having at least two phenolic hydroxyl groups, 59.5 parts diallyl phthalate, 29 parts polyvinyl formal and 21 parts of sodium polymerized polybutadiene.

4. A curable, resinous composition comprising by weight 100 parts of epoxy resin comprising the reaction product of an epihalogenohydrin and a phenol having at least two phenolic hydroxyl groups, 133 parts polyvinyl formal and 33.3 parts of polybutadiene.

5. A resinous composition comprising by weight about 100 parts of thermosetting resin selected from the group consisting of an epoxy resin comprising the reaction product of an epihalogenohydrin and a phenol having at least two phenolic hydroxyl groups, and a mixture of about 1 part of said epoxy resin and about 1.5 parts of diallyl phthalate, a curing agent for said epoxy resin, from about 10 to 50 parts of sodium polymerized polybutadiene containing 1,2-butadiene polymer, a peroxide curing agent for said polybutadiene and from about 25 to 135 parts of polyvinyl acetal resin.

6. An electrical conductor coated with the composition of claim 5.

7. A laminate comprising laminae bonded with the curable resinous composition of claim 5.

References Cited by the Examiner

UNITED STATES PATENTS

| | | | |
|---|---|---|---|
| 2,684,352 | 7/54 | Fisk | 260—887 |
| 2,713,565 | 7/55 | Howard et al. | 260—831 |
| 2,713,567 | 7/55 | Scheibli | 260—837 |
| 2,886,473 | 5/59 | Schroeder | 260—837 |

MURRAY TILLMAN, *Primary Examiner.*

LEON J. BERCOVITZ, WILLIAM H. SHORT,
*Examiners.*